(12) United States Patent
Mergist

(10) Patent No.: US 7,576,460 B1
(45) Date of Patent: Aug. 18, 2009

(54) ENERGY CONVERSION SYSTEM

(75) Inventor: Jerome Mergist, P.O. Box 132, Erath, LA (US) 70533

(73) Assignee: Jerome Mergist, Abbeville, LA (US)

( * ) Notice: Subject to any disclaimer, the term of this patent is extended or adjusted under 35 U.S.C. 154(b) by 260 days.

(21) Appl. No.: 11/890,844

(22) Filed: Aug. 8, 2007

(51) Int. Cl.
H02K 49/00 (2006.01)
H02K 7/00 (2006.01)

(52) U.S. Cl. ............... 310/80; 310/112; 310/114; 310/261

(58) Field of Classification Search .......... 310/80, 310/103, 112, 114, 261
See application file for complete search history.

(56) References Cited

U.S. PATENT DOCUMENTS

| | | | | |
|---|---|---|---|---|
| 4,098,192 A * | 7/1978 | Breed | ............... | 102/232 |
| 4,150,580 A * | 4/1979 | Silkebakken et al. | ............... | 74/5 R |
| 4,877,379 A * | 10/1989 | Okabe | ............... | 418/51 |
| 5,800,311 A * | 9/1998 | Chuang | ............... | 482/44 |
| 6,384,500 B1 * | 5/2002 | Chassoulier et al. | ............... | 310/90.5 |
| 6,713,918 B2 * | 3/2004 | Laing | ............... | 310/90 |
| 6,736,616 B2 * | 5/2004 | Laing et al. | ............... | 417/423.7 |
| 6,906,441 B2 * | 6/2005 | Mendenhall | ............... | 310/112 |
| 6,909,205 B2 * | 6/2005 | Corcoran et al. | ............... | 310/12 |
| 2004/0063546 A1 * | 4/2004 | Chuang et al. | ............... | 482/45 |
| 2004/0232790 A1 * | 11/2004 | Mendenhall | ............... | 310/112 |

* cited by examiner

Primary Examiner—Tran N Nguyen

(57) ABSTRACT

An energy conversion system that converts electrical energy to mechanical energy, and with certain power supplies can convert solar energy into mechanical energy. It operates on a timed direct current pulse and its configuration causes a magnetic field to align with a rotational shaft, two rotors, and one or more stationary field pieces each having a coil. One rotor has a spherical configuration and the second rotor mounted on the same shaft has an arcuate configuration with truncated ends. A coil can be mounted between the two rotors. The offset position of field coils allows for higher torque in low to high rpm ranges. The spherical rotor shape was chosen for ease of construction, mass in a condensed space, less gyroscopic effects than flat flywheels, and positive effects of placement in magnetic circuit. Since there is only one major moving part, the present invention is simple, long-lasting, and virtually problem-free.

6 Claims, 6 Drawing Sheets

ENERGY CONVERSION SYSTEM

CROSS-REFERENCES TO RELATED APPLICATIONS

None

BACKGROUND OF THE INVENTION

1. Field of the Invention

This invention relates to the fields of electrical motors and energy conversion devices, specifically to an energy conversion system that converts electrical energy to mechanical energy, including the conversion of solar energy into mechanical energy. It operates on a timed direct current pulse and its configuration causes a magnetic field to align with a rotational shaft, two rotors, and one or more stationary field pieces each having a coil. One rotor has a spherical configuration and the second rotor mounted on the same shaft has an arcuate configuration with truncated ends. Optionally, a coil can be mounted on the same shaft between the two rotors. The offset position of field coils allows for higher torque in low to high rpm ranges. The spherical rotor shape was chosen for ease of construction, concentrated mass in a condensed space for less gyroscopic effects than flat flywheels, and positive effects of placement in magnetic circuit. Since there is only one major moving part, the present invention is simple, long-lasting, and virtually problem-free.

2. Description of the Related Art

Many electric motors are known. However, they do not have the advantages of the present invention related to its spherical rotor and the relationship between the spherical and arcuate rotors. For example, only saturation current is required to run the present invention energy conversion system and it does not depend upon conventional style voltage and amperage. In addition, the spherical rotor has dual purpose. It acts as a flywheel and magnetic reservoir, which produces less gyroscopic effect and will have less I²R losses. In addition, the distance separation of the coils allows for less counter electromotive force (EMF). Counter EMF is a problem with conventional motors. Further, the offset positioning of field pieces in combination with an arcuate rotor with truncated ends allows for higher torque. There is no invention known having the same structure as the present invention or all of its advantages.

BRIEF SUMMARY OF THE INVENTION

The primary objective of the invention is to provide a means of converting solar power into mechanical energy. Another objective of the invention is to provide a means of power conversion in remote areas where conventional power is not available. Yet another objective of this invention is to provide a means of energy conversion designed for adaptation to both large and small applications. It is also an objective of this invention is to provide a durable means of energy conversion. It is a further objective of this invention is to provide a means of energy conversion that is efficient to produce, operate and maintain.

The present invention provides an energy conversion system that converts electrical energy to mechanical energy, and with certain power supply configurations can convert solar energy into mechanical energy. The present invention operates on a timed direct current pulse and its configuration typically causes a magnetic field to align with a rotational shaft, two rotors (a spherical rotor and an arcuate rotor with truncated ends), and at least one stationary coil that can operate with or without a ferrous core. A rotor coil may also be mounted on the shaft between the two rotors, and may move with the rotors or not. The offset position of the field coils allows for higher torque in low to high rpm ranges. The spherical shape of rotor was chosen for ease of construction, mass in a condensed space, less gyroscopic effects than flat flywheels, and positive effects of placement in magnetic circuit. Since there is only one major moving part, the present invention is simple, long-lasting, and virtually problem-free. Further, when compared to electrical motors of equal horsepower, the present invention is smaller in size and weight. Further an increase in diameter of the spherical rotor allows for significant and exponential increase in power.

The description herein provides preferred embodiments of the present invention but should not be construed as limiting its scope. Thus, the scope of the present invention should be determined by the appended claims and their legal equivalents, rather than being limited to the examples given.

DETAILED DESCRIPTION OF THE INVENTION

Figure 5:
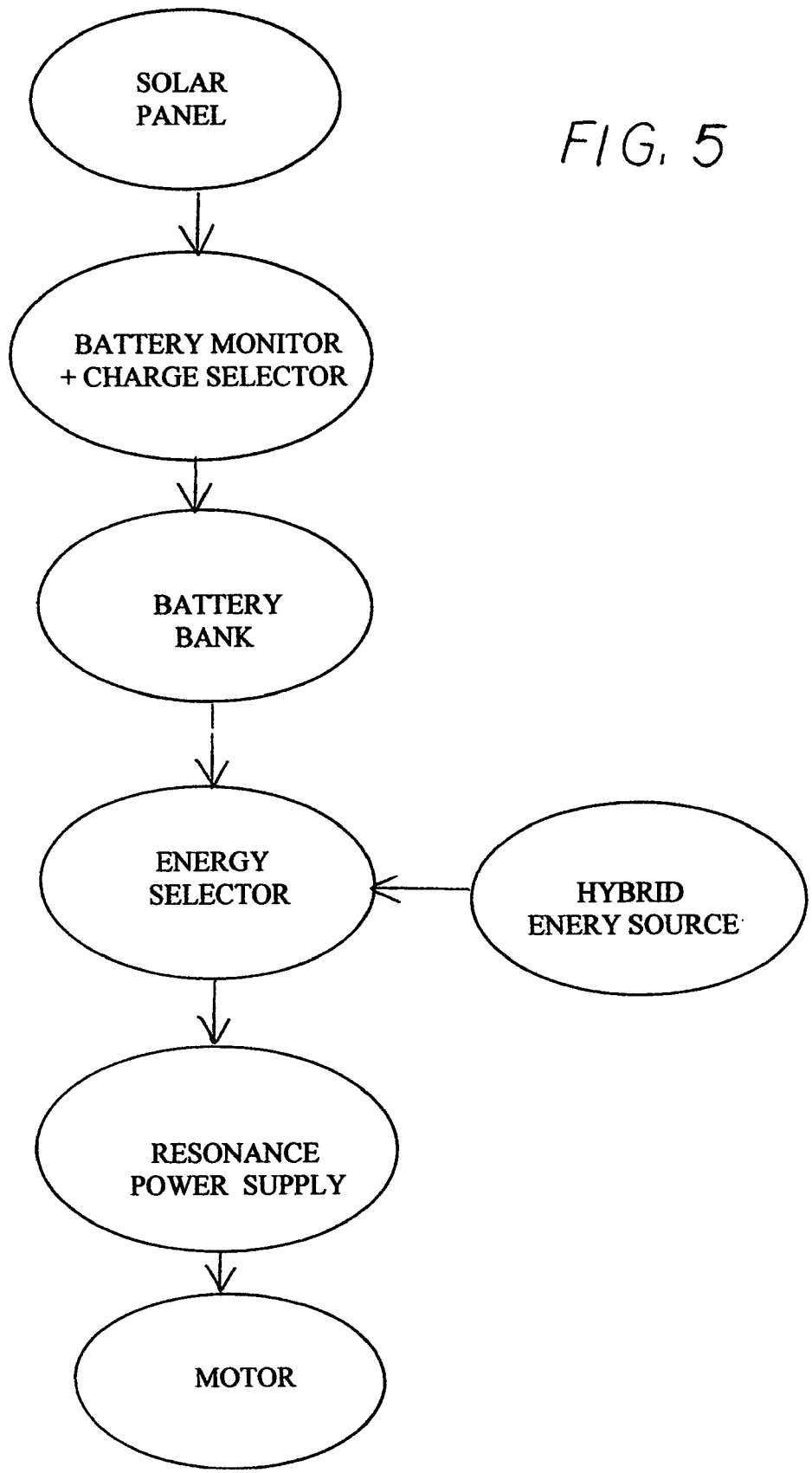
FIG. 5 is a schematic showing the power flow sequence when the most preferred embodiment of the present invention is used to convert solar energy into mechanical energy for any rotational application.
Figure 6:
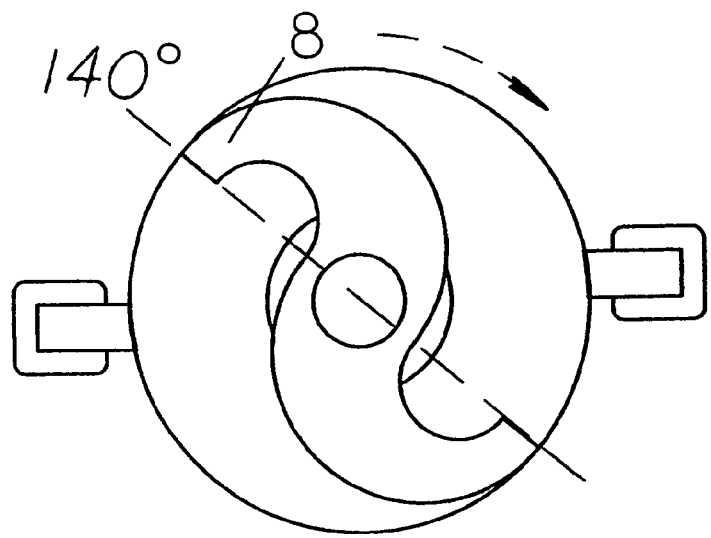
FIG. 6 is a front end view of the most preferred embodiment of the present invention with its arcuate rotor in the 140 degree position where its opposed ends are 140 degrees in advance of the zero position shown in FIG. 8 and when the field coils are energized magnetic attraction draws the arcuate rotor toward the most adjacent field coil so that rotation of the shaft and its associated members begins.
Figure 7:
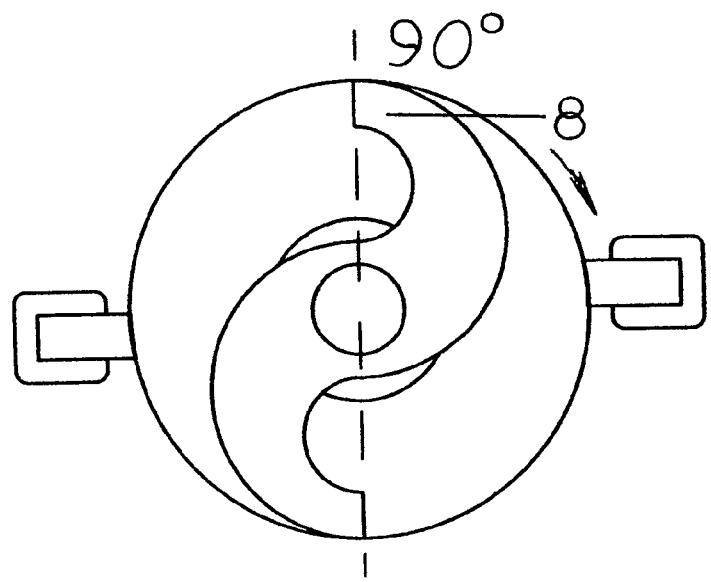
FIG. 7 is a front end view of the most preferred embodiment of the present invention with its arcuate rotor in the 90 degree position where its opposed ends are 90 degrees in advance of the zero position shown in FIG. 8 and as rotation continues, the main body of the arcuate rotor moves closer to the most adjacent field piece, with the speed of rotation increasing as the magnetic attraction becomes stronger.
Figure 8:
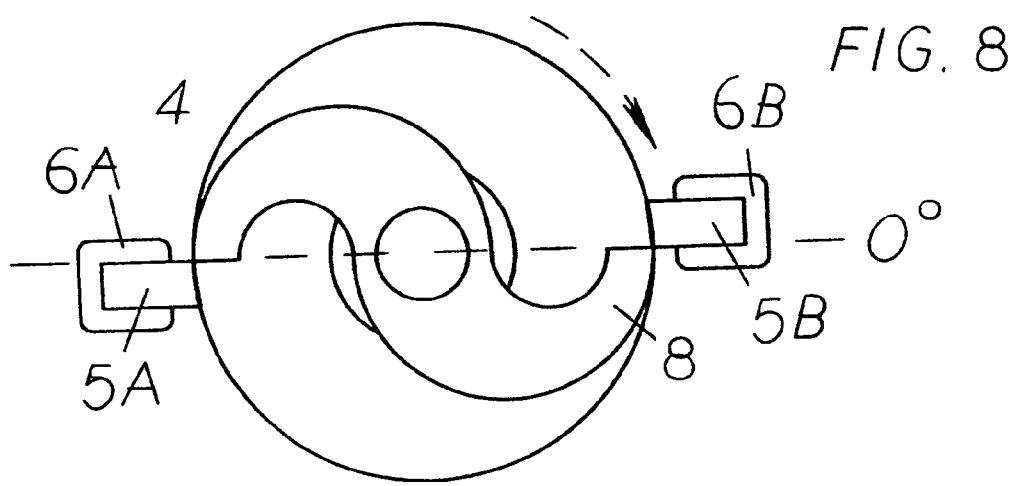
FIG. 8 is a front end view of the most preferred embodiment of the present invention with its arcuate rotor in the zero degree position where its opposed ends are aligned with the field pieces and magnetic attraction/torque is the strongest.

The present invention provides an energy conversion system that converts electrical energy to mechanical energy, and with certain power supply configurations can convert solar energy into mechanical energy. FIGS. 1-4 show various views of the most preferred embodiment 1 of the present invention, while FIG. 5 shows a schematic view of the steps of energy during the conversion of solar or hybrid power to mechanical energy while using the present invention. FIGS. 6-8 then show three important positions possible for the arcuate rotor 3 during the energy conversion process. There is a common arrangement of bearings and non-ferrous frame that are used with the present invention and which have been omitted for clarity of illustration. The present invention operates on a timed direct current pulse and its configuration typically causes a magnetic field to align with a rotational shaft 4, two rotors (spherical rotor 2 and arcuate rotor 3 with truncated ends 8), and at least one stationary coil (6 or 7) that can operate with or without a ferrous core. The stationary portions of the present invention are typically supported in their usable positions by the non-ferrous frame. Although not critical, a rotor coil 7 can be mounted on shaft 4 between rotors 2 and 3. It may move with rotors 2 and 3, or not. The offset position of field coils 6 allows for higher torque in low to high rpm ranges. The spherical shape of rotor 2 was chosen for ease of construction, mass in a condensed space, less gyroscopic effects than flat flywheels, and positive effects of placement in magnetic circuit. Since there is only one major moving part, the present invention is simple, long-lasting, and virtually problem-free. Further, when compared to electrical motors of equal horsepower, the present invention is smaller in size and weight. Further an increase in diameter of spherical rotor 2 allows for significant and exponential increase in power.

Figure 1:
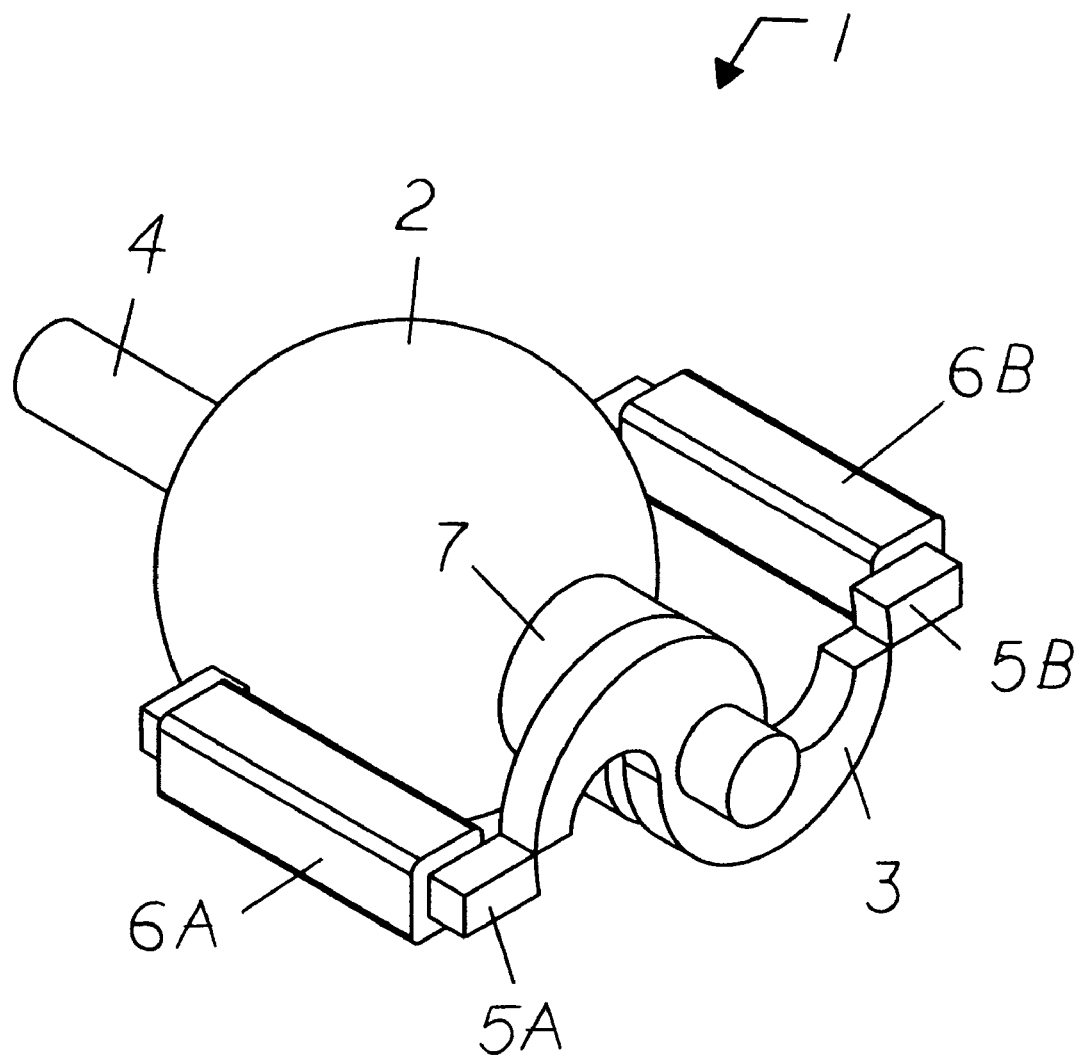
FIG. 1 is a perspective view of the most preferred embodiment of the present invention having a spherical rotor and an arcuate rotor with truncated ends mounted on a common shaft, a rotor coil also mounted on the shaft between the spherical and arcuate rotors, and two field pieces each with a coil.
Figure 2:
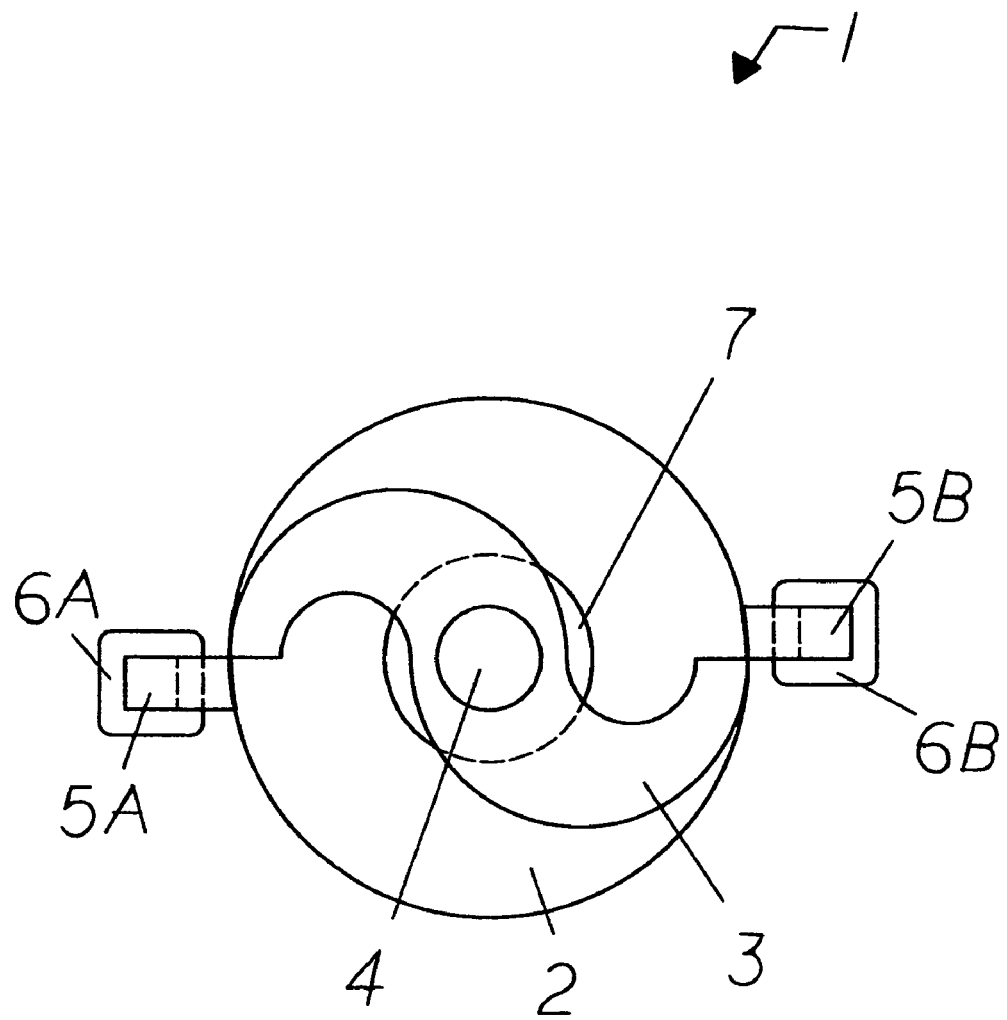
FIG. 2 is a front end view of the most preferred embodiment of the present invention having a spherical rotor, an arcuate rotor, and a rotor coil each mounted on a common shaft, with the arcuate rotor closest to a viewer and the rotor coil between the arcuate and spherical rotors, with two field pieces each with a coil also being shown.
Figure 3:
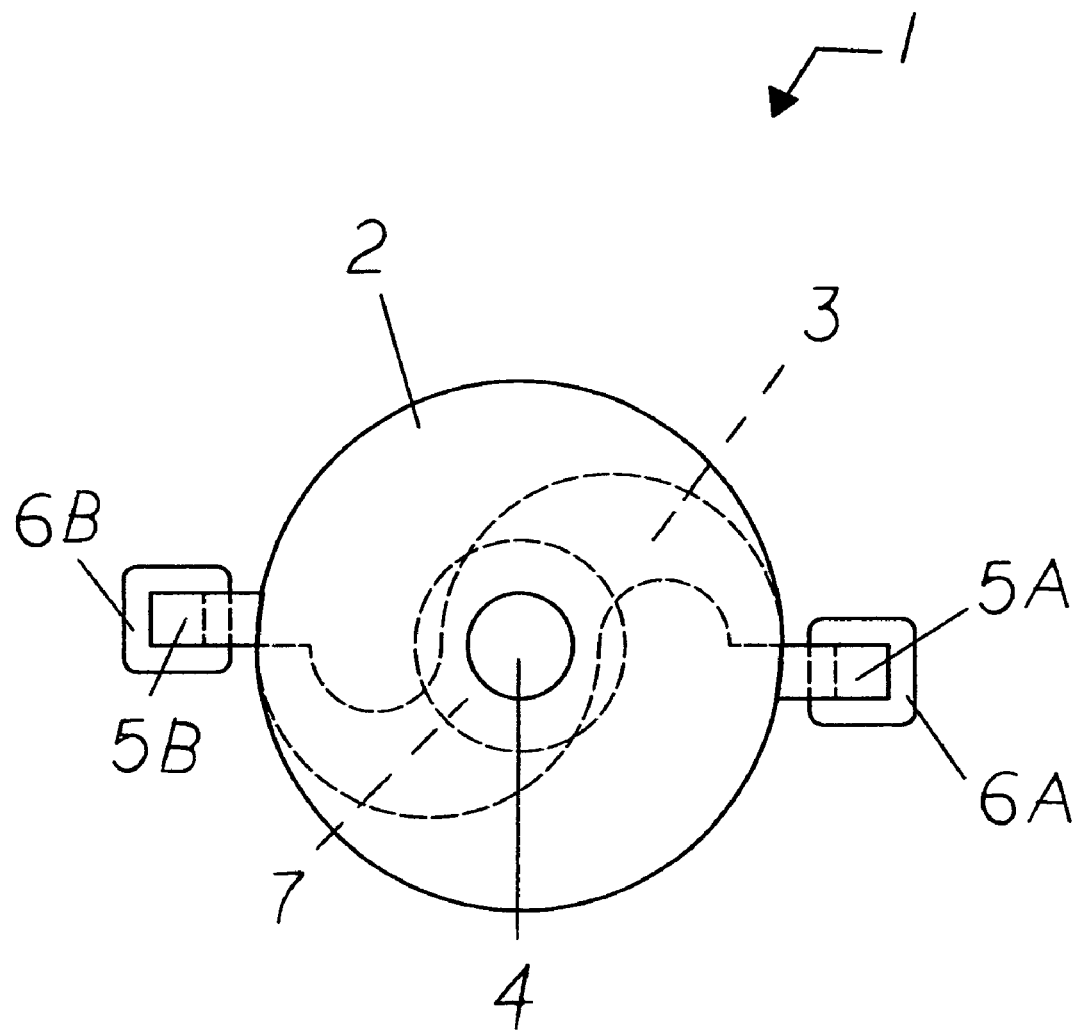
FIG. 3 is a back view of the most preferred embodiment of the present invention having a spherical rotor, an arcuate rotor, and a rotor coil each mounted on a common shaft, with the spherical rotor closest to a viewer and the rotor coil between the spherical and arcuate rotors, with two field pieces each with a coil also being shown.
Figure 4:
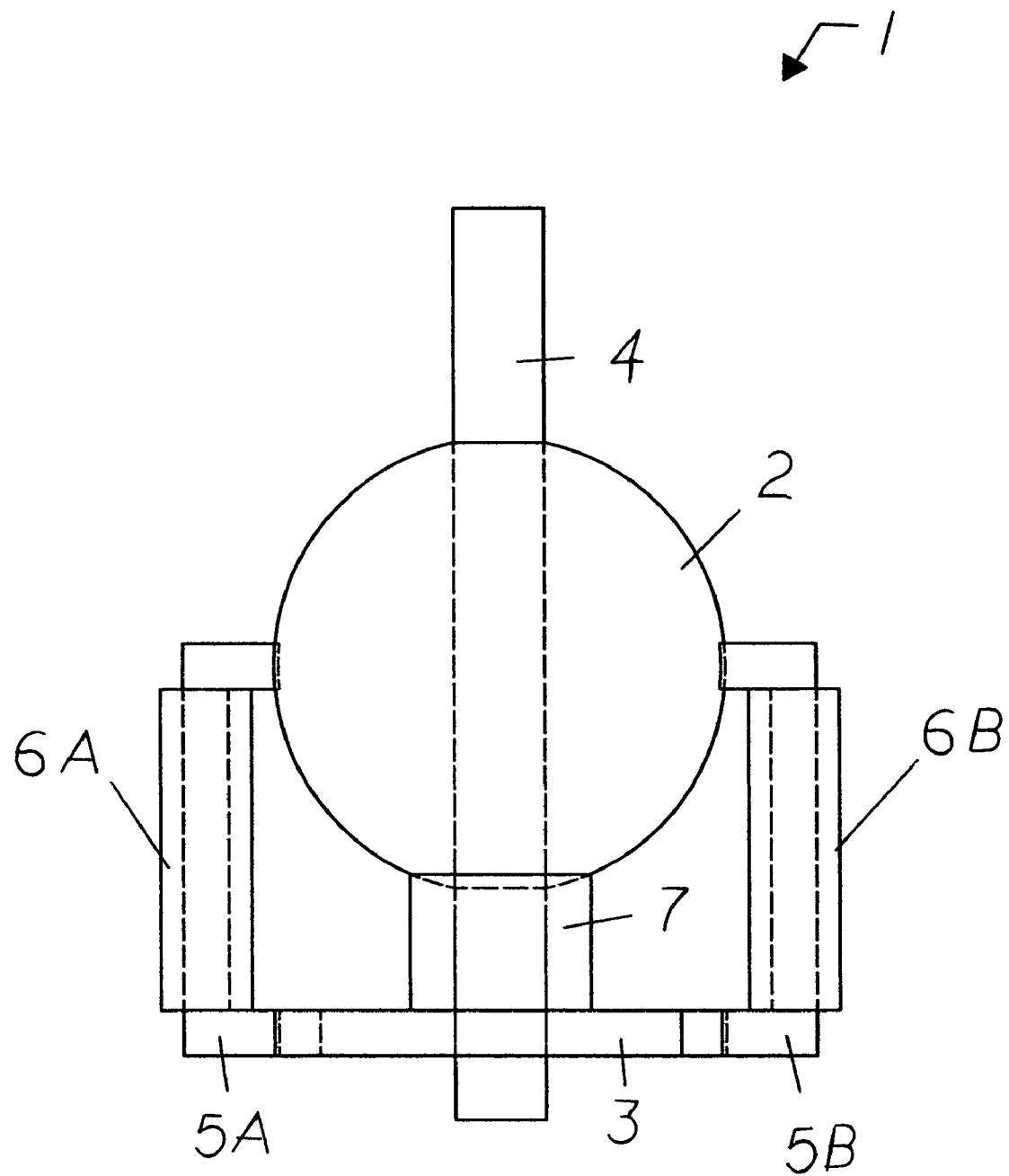
FIG. 4 is a top view of the most preferred embodiment of the present invention having a spherical rotor and an arcuate rotor with truncated ends mounted on a common shaft, a rotor coil also mounted on the shaft between the spherical and arcuate rotors, and two field pieces each with a coil.

FIGS. 1-4 show the most preferred embodiment 1 of the present invention having a spherical rotor 2 and an arcuate rotor 3 with truncated ends (given the numeral designation of 8 in FIGS. 6-8) mounted on a common shaft 4. Although shaft 4 needs to be ferrous in the configuration shown in FIGS. 1-4, the use of a ferrous material for shaft 4 in all embodiments of the present invention is not mandatory. A rotor coil 7 is also mounted on shaft 4 between spherical rotor 2 and arcuate rotor 3. FIGS. 1-4 also show two field pieces 5A and 5B each with a coil, respectively numbered as 6A and 6B. The truncated ends 8 of arcuate rotor 3 allow for the saturation from shaft 4 to be split equally for direction toward the field pieces 5A and 5B. Although two field pieces 5A and 5B are shown, the number of field pieces 5 used is not restricted to that shown, as long as at least one filed piece 5 is used. FIG. 1 is a perspective view of the most preferred embodiment of the present invention where spherical rotor 2 is shown centered between the back portions of field pieces 5A and 5B. FIGS. 2, 3, and 4 respectively show front end, back, and top views of the same preferred embodiment 1 of the present invention. The field pieces 5A and 5B are shifted to an offset position from a center line (marked as the zero degree position in FIG. 8) to allow for a maximum of approximately 280 degrees of magnetic attraction during each revolution of arcuate rotor 3. The operator of the present invention is able to set the maximum amount of attraction during each revolution of arcuate rotor 3 according to a needed application, to speed up rotation, as well as retard and even reverse rotation. When the field pieces 5A and 5B are saturated, the magnetic field produced has a shape that is inverse to its own physical shape. Also, when there are one or more field coils 5 and one or more rotor coils 7, the field coils 5 are each energized to produce magnetic poles opposite to that of the rotors 2 and 3 to enhance magnetic attraction.

FIG. 5 is a schematic showing the power flow sequence when the most preferred embodiment of the present invention is used to convert solar energy and/or hybrid energy into mechanical energy for any rotational application. As seen in FIG. 5, when energy is absorbed by the solar panel, a battery monitor and charge selector are used to transfer the absorbed energy to a battery bank of at least two batteries, with the transferred energy being directed to the battery with lowest potential. The battery monitoring can be manual or automated. An energy selector is then used for seamless transfer of power from the battery with the highest potential to a resonance power supply, which then directs controlled pulses of electrical energy to a motor at desired times. As an alternative to the use of solar power, as shown in FIG. 5, energy may be seamless drawn by the energy selector from a hybrid energy source for direction to the resonance power supply. The resonance power supply must be of sufficient size so that energy drain by the motor is minimal.

FIGS. 6-8 show the advancement of one the arcuate rotor 3 in the most preferred embodiment of the present invention. FIG. 6 shows arcuate rotor 3 in the 140 degree position where its opposed ends are 140 degrees in advance of the zero position shown in FIG. 8. When the field coils 6A and 6B are energized, magnetic attraction draws the arcuate rotor 3 toward the adjacent field coil 5 in a clockwise direction in the configuration shown in FIGS. 6-8, so that rotation of shaft 4 and its associated members (spherical rotor 2, acruate rotor 3, and rotor coil 7) begins. FIG. 7 is a front end view of the most preferred embodiment of the present invention with its arcuate rotor 3 in the 90 degree position where its opposed end 8 is 90 degrees in advance of the zero position shown in FIG. 8 and as rotation continues, the main body of the arcuate rotor 3 moves closer to the adjacent field piece 5, with the speed of rotation increasing as the magnetic attraction and torque become stronger. FIG. 8 is a front end view of the most preferred embodiment of the present invention with its arcuate rotor 3 in the zero degree position where its opposed ends 8 are aligned with the field pieces 5 and magnetic attraction/torque is the strongest. FIG. 8 shows the strongest attraction of rotor 3 to field pieces 5 and the field pieces 5 are de-energized at a position in advance of this point to allow for magnetic field collapse without retarding rotation. After the zero degree position shown in FIG. 8 is achieved, arcuate rotor 3 advances on its own inertia to the 140 degree position shown in FIG. 6, and rotation will continue as long as power is applied in proper sequence. During the inertial movement, little or no magnetic attraction is involved in the advancement of rotors 2 and 3. To reduce or eliminate periods of little or no magnetic attraction during rotor 3 rotation, more field pieces 5 may be added around arcuate rotor 3 and spherical rotor 2. The zero degree position shown by the broken line in FIG. 8 which bisects shaft 4 clearly shows the offset positioning of field pieces 5A and 5B (as well as field coils 6A and 6B) relative to shaft 4. For a complete understanding of the process disclosed in FIGS. 6-8 one must remember that arcuate rotor 3 and spherical rotor 2 are locked together on shaft 4. Rotor coil 7 may be also locked with the rotors 2 and 3, or not.

I claim:
1. An energy conversion system that converts electrical energy to mechanical energy, said system comprising:
   a shaft;
   a first ferrous rotor mounted on said shaft and having a spherical configuration;

a second ferrous rotor mounted on said shaft and having an arcuate configuration with truncated ends; and at least one coil selected from a group consisting rotor coils and field coils, said at least one coil positioned in close proximity to but not touching either of said rotors, wherein when said at least one coil is energized, magnetic attraction needed for rotor rotation is provided.

2. The system of claim 1 further comprising at least one field piece in close proximity to but not touching either of said rotors.

3. The system of claim 1 wherein said at least one coil is energized with a timed direct current pulse.

4. The system of claim 1 wherein said at least one coil is positioned on said shaft between said first rotor and said second rotor.

5. The system of claim 1 wherein said at least one coil is a field coil in an offset position relative to said shaft.

6. The system of claim 1 further comprising a resonance power supply of predetermined size to energize said at least one coil with predetermined minimal impedance affecting resonance power supply.

* * * * *